Oct. 14, 1958   R. ZARGARPUR   2,855,889
INDICATORS
Filed March 23, 1955

INVENTOR
ROUHOLAH ZARGARPUR

BY John C. Black
ATTORNEY

United States Patent Office 2,855,889
Patented Oct. 14, 1958

2,855,889

INDICATORS

Rouholah Zargarpur, River Forest, Ill., assignor to Stewart-Warner Corporation, Chicago, Ill., a corporation of Virginia Application March 23, 1955, Serial No. 496,162

3 Claims. (Cl. 116—129)

This invention relates in general to devices for indicating various operational conditions in vehicles and more particularly to improved indicator elements and to the use of functional color schemes therewith.

The invention disclosed herein can be used for the various gauges normally found, for example in automobiles, such as the fuel gauge, the oil pressure gauge, the ammeter and the engine temperature gauge.

In early days of the automobile, many gauges were of the type in which a calibrated drum was rotatably mounted on a vertical axis behind a fixed pointer on the dashboard; however, it became apparent that there was a great amount of strain on the operator of the car if he tried to read one of these gauges while the car was in motion because it required an accurate reading of the numeral on the drum behind the pointer.

In order to reduce the strain on the operator, automobile manufacturers soon abandoned the abovementioned type of gauge in favor of one in which a pointer was rotatably mounted on a horizontal axis behind a transparent faceplate rigidly mounted on the dashboard, the faceplate (or a background surface behind the pointer) having calibrations indicating the complete operational range. In this type gauge, the calibrations and numerals were permanently placed in a fixed location and were more easily distinguished; and the operator could now observe the relative position of the pointer with respect to the numerals to more easily determine the operational condition which he desired to know. However, even in this method it will be noted that the operator must observe a narrow pointer as well as its relative position with respect to a scale which is angularly disposed about the axis of the pointer.

The applicant now proposes to further reduce the strain upon the operator by combining the better features of each of the above two types of gauges with a moving indicator element different from those found in prior automotive gauges.

More specifically, the applicant uses a faceplate with the desired calibrations and numerals marked thereon, the calibrations being arranged on a straight line basis rather than on an angular basis, which straight line arrangement is much easier to read. In the preferred embodiment, the applicant provides a rectangular slit in the faceplate. Instead of a drum rotating upon a vertical axis, or a pointer on a horizontal axis, the applicant now provides an arm rotating on a vertical axis, with a flag-like vertically-disposed projection on the end thereof, said projection adapted to be rotated in a path visible through said faceplate slit. Behind the path of said flag-like projection and visible through said slit is a stationary background surface of a color contrasting with the color of the flag-like projection. It is readily apparent that the straight line indications of the earliest gauge are present in this improved arrangement; and the non-moving scale with the desired operating range of the second mentioned type gauge is present whereby observations can be made of the relative position of the indication.

It is apparent that, if accurate readings are of importance, the instantaneous value of the particular operational condition is more easily obtained and with less chance of operator error when the position of a vertical line described by the intersection of two areas of contrasting colors is observed with respect to a scale than when the position of a narrow pointer is observed with respect to a contrasting background surface and scale. This is especially true when the scale and pointer position of the prior art structures are angularly located about the axis of the pointer whereas the applicant's line is vertical and his scale is straight line.

It is also obvious that the present indicator arrangement will be as accurate as the particular actuating means with which it is used.

However, in normal vehicle operation, precise values are usually not necessary; and, as a result of the provision of the applicant's arrangement, the operator need only judge (1) the relative proportion of the entire scale covered by the visible portion of the flag-like element, or (2) the relative proportion of the visible flag-like projection area to the visible background area to get an approximation of the particular operational condition in which he is interested. It is believed that the operator will soon become proficient enough to accurately estimate the desired operational condition by a mere momentary glance at the appropriate indicator.

This method is even more enhanced when it is realized that, under ordinary conditions, the operator is interested in knowing only whether the particular operating condition is (1) excellent, (2) tolerable or (3) at a danger point. Often the operator desires to know only the presence or absence of danger.

The applicant further proposes to relieve the strain by using functional color schemes to aid the operator—i. e. as the operational condition on the particular gauge approaches a danger point, a predominance of red will be observed through the slit in the preferred embodiment, the color red universally being recognized as a sign of danger especially during the operation of vehicles. The applicant further provides in the preferred embodiment that a predominance of green will be visible through the slit when the operational condition is at a safe point.

The applicant herein further provides in the preferred embodiment red and green colors having fluorescent characteristics and causes a beam of light to be directed upon said colors so that they are more readily distinguishable to the operator, especially under night driving conditions.

The applicant has found that a dull black faceplate with white calibrations and letters painted thereon provides an excellent background when used with the above said red and green color scheme.

Although the colors red and green are not distinguishable as such by the operator who is color blind, nevertheless the two colors appear as different shades of gray to such an operator; and, therefore he can observe the vertical line along which the two colors intersect.

Other objects and features of the invention will be apparent upon a perusal of the following disclosure in which.

Figure 2:
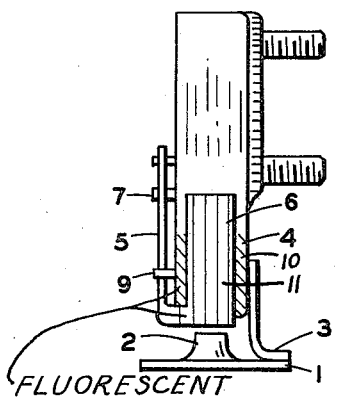
Fig. 2 shows a side elevation view thereof.

Rigidly mounted on the dashboard in any well known manner is a faceplate 1 with a rectangular slit 2 therein.

An element 4 having a curved background surface 10 is rigidly mounted behind and symmetrical with the slit 2 by means of a bracket 3 welded to faceplate 1 and to the element 4. A pointer 5 is rotatably mounted on a vertical axis 7 disposed within the element 4 and coincident with the axis of the curved background surface 10 of element 4. At the outer end of the pointer 5 is a curved flag-like projection 6, having a forwardly facing surface 11, which rotates in a path adjacent to the curved background surface 10 of element 4 and between said element and the faceplate 1.

Figure 1:
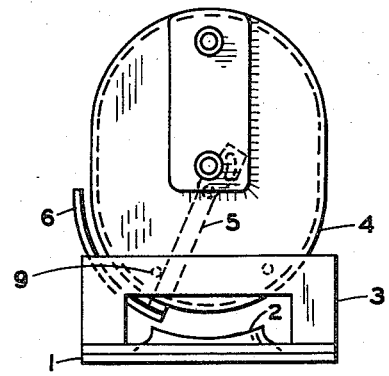
Fig. 1 shows a top view of the faceplate, indicator and background elements.
Figure 3:
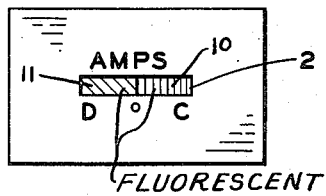
Figs. 3–6 show a front elevation view of the faceplate and the visible portions of the indicator and background surfaces of an ammeter, an oil pressure gauge, a temperature gauge and a fuel gauge respectively with the indicator in its normal position when the vehicle is not in operation.
Figure 4:
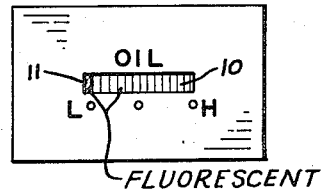
Figure 5:
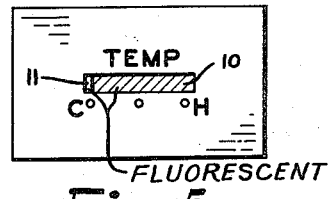

With respect to Fig. 1, the flag-like projection 6 will normally be positioned with its right-hand edge directly behind the empty calibration on faceplate of the fuel gauge specie (Fig. 6), on the zero or cold calibration on the temperature gauge specie (Fig. 5), on the zero or low calibration for the oil pressure gauge (Fig. 4). However, in the ammeter specie, as shown in Fig. 3, the right-hand edge of the flag-like projection 6 will be positioned at the middle calibration so that it can be rotated to the right or left depending upon whether the battery is charging or discharging.

Figure 6:
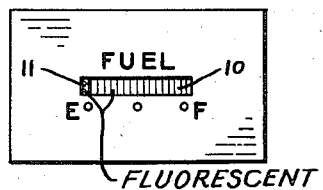

As has been noted above, the use of the colors red and green for the surfaces 10 and 11 is preferred. In the case of the fuel gauge, the background surface 10 is red and the surface 11 green so that as the fuel tank approaches "empty" a predominance of red will be visible (Fig. 6). Similarly, the background surface 10 is red and the surface 11 green in the oil pressure gauge so that red will be predominant when the oil pressure is "low" (Fig. 4). In the ammeter (Fig. 3), red is used on the background surface 10 and green on the surface 11 so that red will be predominant if the battery is discharging, causing the projection 6 to rotate toward the left. And finally in the temperature gauge (Fig. 5), green is used on the background surface 10 and red on the surface 11 so that red will be predominant when the temperature becomes too high.

Figure 7:
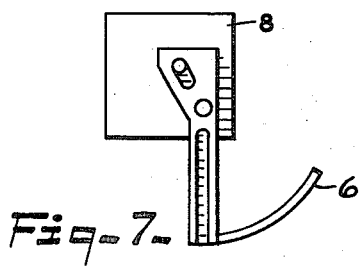
Fig. 7 shows the indicator and diagrammatically its driving means.

In Fig. 7, an actuating means 8 is diagrammatically disclosed. It is apparent that any one of a great number of gauge actuating means, of the type in which a pointer is rotated in accordance with the varying operational condition of the vehicle, may be used. For example, a typical oil pressure gauge actuating means is disclosed in Patent 2,607,228, issued August 19, 1952, to G. E. Coxon; a typical fuel gauge actuating means in Patent 2,508,290, issued May 16, 1950, to W. C. Poetsch; a temperature gauge actuating means, in Patent 2,391,992, issued January 1, 1946, to H. F. Malone; and an ammeter actuating means, in Patent 2,498,087, issued February 21, 1950, to A. E. LeVan. The disclosures of the foregoing patents are hereby incorporated herein by reference to the same extent as if they were set forth in full herein.

In a manner well known in the art, biasing means (not shown) will be provided in the actuating means 8 to properly position the indicator 6. Stops 9 are placed at either end of the scale to limit the travel of indicator 6.

While there has been described what is at present believed to be the preferred embodiment of the invention, it will be understood that various modifications may be made therein; and it is contemplated to cover in the appended claims all such modifications as fall within the true spirit and scope of the invention.

What is claimed is:

1. An instrument for giving continuous visual indications of a certain operational condition of a vehicle in response to the operation of a directively controlled actuating means comprising: a stationary, curved, opaque background surface coated with a fluorescent pigment of one color; an opaque faceplate adjacent said surface and having a rectangular slit through which said surface may be observed; a curved, opaque flag-like element at least as wide as the width of said slit and substantially as long as the length of said slit and disposed between said surface and said faceplate and having its surface, next adjacent to the faceplate, coated with a fluorescent pigment of a color contrasting with said one color; mechanism, including a shaft pivoted on an axis lying in a plane substantially parallel with the plane of the slit and disposed parallel with the width of the slit, for supporting the element for rotation in an arcuate path between the slit and background surface; one of said colors being red; and means connecting said mechanism to said actuating means for directively rotating the shaft to move said element across the background surface to cause said two contrasting colors to be observed through the slit in correspondingly varying proportions to indicate the presence or absence of a dangerous operational condition by a predominance of red or the other color respectively and the relative degree of the presence or absence of danger of said operational condition.

2. An instrument for giving continuous visual indication of a certain variable condition, said instrument comprising: a stationary opaque background surface of one color; an opaque faceplate adjacent said surface and having a rectangular aperture through which the surface may be observed; an element having an opaque surface at least as wide as the width of said aperture and substantially as long as the length of said aperture, the opaque surface next adjacent to the faceplate being of a color contrasting with said one color and having an indication edge transverse to the length of said aperture; means including a shaft pivoted on an axis parallel to the width of the aperture for supporting said element for rotation in an arcuate path between said background surface and said aperture to permit visual observation of a varying portion of the element surface and only of that portion of the background surface behind the space between said indication edge and a predetermined end of said aperture; and condition responsive means for rotating said shaft to move the element across said background surface to cause said two contrasting colors to be observed through the aperture in correspondingly varying proportions.

3. The combination claimed in claim 12 wherein the observable section of said background surface and said element are similarly curved and substantially parallel and wherein their axes of curvature substantially parallel with the axis of the shaft.

References Cited in the file of this patent

UNITED STATES PATENTS

| | | |
|---|---|---|
| 1,144,009 | Swanson | June 22, 1915 |
| 1,629,680 | Cooke | May 24, 1927 |
| 2,023,934 | Moise | Dec. 10, 1935 |
| 2,759,447 | Helgeby | Aug. 21, 1956 |

UNITED STATES PATENT OFFICE
CERTIFICATE OF CORRECTION

October 14, 1958

Patent No. 2,855,889       Rouholah Zargarpur

It is hereby certified that error appears in the printed specification of the above numbered patent requiring correction and that the said Letters Patent should read as corrected below.

Column 4, line 52, for the claim reference numeral "12" read -- 2 --.

Signed and sealed this 6th day of January 1959.

(SEAL)

Attest:
KARL H. AXLINE
Attesting Officer

ROBERT C. WATSON
Commissioner of Patents